(12) United States Patent
Holmgren

(10) Patent No.: US 12,454,160 B2
(45) Date of Patent: Oct. 28, 2025

(54) CONTROL ARM FOR A WHEEL SUSPENSION IN A MOTOR VEHICLE

(71) Applicant: BENTELER AUTOMOBILTECHNIK GMBH, Paderborn (DE)

(72) Inventor: Tom Holmgren, Gjovik (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/911,188

(22) Filed: Oct. 9, 2024

(65) Prior Publication Data

US 2025/0115087 A1   Apr. 10, 2025

(30) Foreign Application Priority Data

Oct. 10, 2023 (EP) ................................. 23202766

(51) Int. Cl.
*B60G 3/02* (2006.01)

(52) U.S. Cl.
CPC ............ *B60G 3/02* (2013.01); *B60G 2206/70* (2013.01)

(58) Field of Classification Search
CPC ...... B60G 2206/10; B60G 3/02; B60G 7/001; B60G 2200/4622; B60G 2206/70
See application file for complete search history.

(56) References Cited

U.S. PATENT DOCUMENTS

| | | | | |
|---|---|---|---|---|
| 4,733,884 A | * | 3/1988 | Pettibone | B60G 7/001 280/86.753 |
| 5,052,711 A | * | 10/1991 | Pirkey | B62D 17/00 280/86.753 |
| 5,651,561 A | * | 7/1997 | Tandy, Jr. | B60G 7/001 280/86.753 |
| 6,027,129 A | | 2/2000 | Kleinschmit et al. | |
| 6,215,624 B1 | * | 4/2001 | Summers | G11B 5/4833 360/244.5 |

(Continued)

FOREIGN PATENT DOCUMENTS

| | | |
|---|---|---|
| DE | 3921468 C1 | 5/1990 |
| DE | 19721752 A1 | 11/1998 |

(Continued)

OTHER PUBLICATIONS

Jang, Cam Bolt Guide for Vehicle, May 25, 2022, EPO, KR 20220067769 A, Machine Translation of Description (Year: 2022).*

(Continued)

*Primary Examiner* — Paul N Dickson
*Assistant Examiner* — Matthew D Lee
(74) *Attorney, Agent, or Firm* — HAUPTMAN HAM, LLP

(57) ABSTRACT

A control arm for a wheel suspension in a motor vehicle has a control arm body made of light metal. The control arm body has two parallel side walls. An elongated hole for an eccentric mount is provided in at least one side wall. The eccentric mount has a base plate with an elongated hole. An anchor body extending on the side of the edge of the elongated hole is provided at the rear of the base plate. At the front, the base plate has two eccentric stops projecting from the base plate. The eccentric mount is inserted with the anchor body into the elongated hole of the side wall and joined by pressing into the elongated hole.

10 Claims, 2 Drawing Sheets

(56) References Cited

U.S. PATENT DOCUMENTS

| | | | | |
|---|---|---|---|---|
| 9,233,589 | B1 * | 1/2016 | Miller | F16B 43/00 |
| 2013/0216298 | A1 * | 8/2013 | Jekel | B60G 7/005 |
| | | | | 403/66 |
| 2015/0231940 | A1 * | 8/2015 | Klaassen | B60G 7/008 |
| | | | | 280/124.116 |
| 2018/0291975 | A1 * | 10/2018 | Cerri, III | B60G 7/008 |
| 2020/0361265 | A1 | 11/2020 | Czajkowski | |
| 2024/0174038 | A1 * | 5/2024 | Vingnesengen | B21D 22/04 |

FOREIGN PATENT DOCUMENTS

| | | | | |
|---|---|---|---|---|
| DE | 102019002874 A1 | | 10/2019 | |
| EP | 2357097 A1 * | | 8/2011 | B60G 21/051 |
| KR | 2003-0018551 A | | 3/2003 | |
| KR | 10-0907068 B1 | | 7/2009 | |
| KR | 10-2022-0067769 A | | 5/2022 | |
| KR | 20220067769 A * | | 5/2022 | B62D 17/00 |

OTHER PUBLICATIONS

Extended Search Report for Europe Application No. 23202766.4, dated Jan. 30, 2024, 18pp.

* cited by examiner

CONTROL ARM FOR A WHEEL SUSPENSION IN A MOTOR VEHICLE

RELATED APPLICATIONS

The present application claims priority of Europe application Ser. No. 23/202,766.4 filed Oct. 10, 2023, the disclosure of which is hereby incorporated by reference herein in its entirety.

FIELD

The present disclosure relates to a control arm for a wheel suspension in a motor vehicle with a control arm body made of light metal, for example, aluminum, which has two side walls parallel to one another, with an elongated hole for an eccentric mount being provided in at least one side wall.

BACKGROUND

Control arms are components of a vehicle's wheel suspension. The control arms have to absorb high radial forces, such as braking and driving forces. In addition, the control arms support the weight of a vehicle in conjunction with other chassis components.

An eccentric adjustment device, which has eccentric elements such as eccentric discs or eccentric screws and/or control elements, is able to be used to align a control arm relative to the connection on the wheel carrier side. In this way, vehicle tolerances are able to be compensated for and the toe and/or camber of the wheels of a motor vehicle are able to be adjusted. The eccentric adjustment device interacts with elongated holes in the side walls of the control arm to which the eccentric adjustment device is able to be attached via an eccentric mount.

Control arms with eccentric adjustment devices are described in US 2020/0361265 A1, DE 10 2019 002 874 A1 or KR 100907068 B1.

In order to achieve the lowest possible component weight, the control arm bodies are able to be made of light metal or a light metal alloy, for example, aluminum from the 5000 series to the 7000 series.

Control arm bodies made of light metal are advantageous in terms of weight. However, the components are also susceptible to damage and wear due to the high forces and torques acting during operation. The control arm bodies are also able to be damaged during assembly or when adjusting the camber and camber angle. This also applies to control arm bodies made of other lightweight materials, such as control arm bodies made of fiber composite plastics.

SUMMARY

The object of the present disclosure is to indicate a lightweight and functionally improved control arm, having wear protection in the region of the connection of an eccentric adjustment device to or in the side walls of the control arm body.

Embodiments and modifications of features of the control arm according to the present disclosure, which, individually or in combination, design and/or further develop the present disclosure in a technically advantageous manner, also result from the description and the accompanying drawings.

A control arm according to the present disclosure for a wheel suspension in a motor vehicle has a control arm body. In at least one embodiment of the present disclosure, the control arm body is made of light metal, for example, aluminum or an aluminum alloy of the 5000 series to 7000 series. The control arm body has two side walls, for example parallel to each other. An elongated hole for an eccentric mount is provided in at least one side wall. The eccentric mount interacts with an eccentric adjustment device. The eccentric adjustment device is able to be used to determine the relative position of the control arm to the wheel suspension and to adjust the camber and toe angle.

The eccentric mount is able to be fixed to or in the elongated hole of a side wall. According to the present disclosure, the eccentric mount has a base plate with an elongated hole opening, wherein an anchor body arranged at the edge of the elongated hole opening is provided at the rear of the base plate. Two eccentric stops projecting from the base plate are arranged at the front of the base plate. The eccentric stops arranged, for example, at the edge of the base plate serve as a control track for an adjusting element of the eccentric adjustment device, such as an eccentric disk. According to the present disclosure, the eccentric mount is press-joined to the anchor body in the elongated hole. For this purpose, the anchor body of the eccentric mount and the elongated hole in the side wall of the control arm are manufactured and matched to each other in such a way that a press fit is created at the connection points after joining. This allows longitudinal and transverse forces to be transmitted in a force-fitting manner.

The eccentric mount according to the present disclosure performs a protective function in a component against wear or damage when adjusting the toe and camber and also functions as an eccentric disk stop of an eccentric adjustment device. In at least one embodiment of the present disclosure, the region in or around the elongated hole in the side wall of the control arm body is protected against wear and damage.

The eccentric mount according to the present disclosure is pressed and press-joined with the anchor body into the elongated hole in the side wall of the control arm body. The joint is highly stable and resilient. Forces are reliably absorbed and transmitted. The light alloy control arm body is protected from wear and damage by the eccentric mount in the connection region. The eccentric mount also saves material costs, weight and material itself. The eccentric mount is also advantageous in terms of installation space. The fixing of the eccentric mount by the anchor body in the elongated hole is optimized in terms of installation space. The base plate of the eccentric mount lies directly against the side wall of the control arm body. The anchor body ensures the highly resilient connection of the eccentric mount to the side wall, provides mechanical protection and at the same time provides the elongated hole opening for the eccentric adjustment device. By integrating the eccentric stops into the eccentric mount, the installation space is able to be optimized.

The anchor body of the eccentric mount is arranged at the rear of the base plate. At the rear of the base plate means that the anchor body protrudes from the base plate on the side facing the side wall of the control arm body. The anchor body is able to be formed around the elongated hole opening. In this embodiment, the anchor body is ring-shaped. The longitudinal walls or webs of the anchor body run parallel and merge into each other through semi-circular wall portions of the anchor body. In at least one embodiment of the present disclosure, the anchor body is a crown or ring in the form of an elongated hole running circumferentially on the rear side of the base plate and turned from the plane of the base plate.

The anchor body is also able to have multiple anchor body portions or anchor body elements that are arranged at the edge of the elongated hole opening.

The anchor body is designed and intended to be inserted into the elongated hole of a side wall of the control arm body and to be pressed together with the side wall in the elongated hole so that the eccentric mount is reliably fixed to the side wall of the control arm body. The eccentric mount is designed as a single piece. The base plate, the anchor body and the eccentric stops are formed in one piece using the same material. In at least one embodiment of the present disclosure, the eccentric mount is made of a steel material.

The eccentric stops are located at the front of the base plate. At the front side of the base plate means that the eccentric stops are provided on the side of the eccentric mount or base plate facing away from the side wall of the control arm body. The eccentric stops are formed from the material of the eccentric mount in the base plate. The eccentric stops are able to, for example, be formed as cams or collars on or in the base plate. In at least one embodiment of the present disclosure, the eccentric stops are formed by turned edge webs on the outer circumference of the base plate.

The eccentric stops formed by the turned edge webs are created by bending. This involves plastically deforming tabs on the edge of the base plate and bending them forward from the plane of the base plate so that they form the edge webs.

The elongated hole in the side wall of the control arm body and the elongated hole opening in the base plate of the eccentric mount are aligned with each other or lie on a common central axis. The anchor body is pressed into the elongated hole in the side wall. A press fit is created between the inner circumference of the elongated hole and the outer circumference of the anchor body after joining at the connection points. Longitudinal and transverse forces are transmitted by force-fit.

To increase the contact pressure of the anchor body in the elongated hole, mechanically widening is able to be performed. This is done by applying an external force on the inside of the elongated hole opening.

An advantageous embodiment provides for an additional form-fit connection to be created between the anchor body and the side wall. For this purpose, the anchor body is additionally molded. This is able to be done by crimping, clinching or embossing the anchor body from the rear of the base plate or on the side of the side wall opposite the base plate. A pushed through joint is also conceivable.

In at least one embodiment of the present disclosure, the anchor body passes through the elongated hole in the side wall at least in certain regions and is formed on the side of the side wall opposite the base plate.

The control arm body is able to be made of light metal or a light metal alloy. In at least one embodiment of the present disclosure, the control arm body is made of aluminum or an aluminum material.

The control arm body is able to be made of a lightweight material, such as a metallic lightweight material or a non-metallic lightweight material, or a fiber composite plastic.

The eccentric mount is made of a higher-strength material than the control arm body material.

The eccentric mount is able to be made of steel.

A further advantageous embodiment provides that the eccentric mount has a surface coating. In at least one embodiment of the present disclosure, a zinc or zinc flake coating is suitable.

Depending on the design variant or model series, the base plate has a rectangular outer contour. The base plate is able to have a circular or elliptical outer contour.

The base plate is able to be embedded in a receptacle in the side wall. The side wall of the control arm body then has a recess in the region around the elongated hole that is adapted to the outer contour of the base plate or matched, in which the base plate is able to lie flush.

BRIEF DESCRIPTION OF THE DRAWINGS

The present disclosure is described in more detail below with reference to embodiments shown in the drawings, as follows.

DETAILED DESCRIPTION

Figure 1:
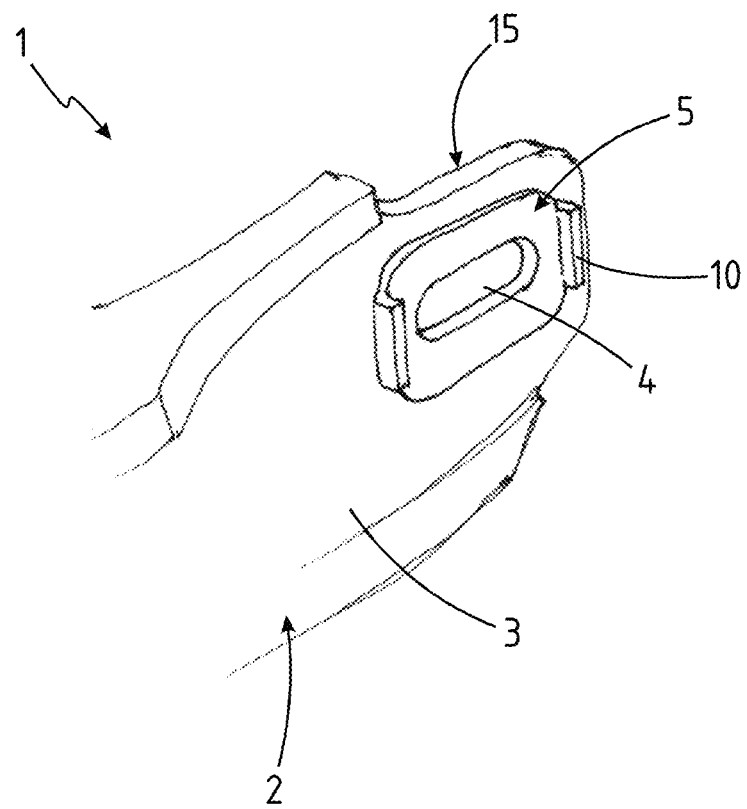
FIG. 1 is a perspective view of a section of a control arm showing a side wall and an eccentric mount joined to the side wall in accordance with the present disclosure.

FIG. 1 shows a section of a control arm 1 for a wheel suspension in a motor vehicle. The control arm has a control arm body 2 made of a light metal material, for example, aluminum from the 5000 to 7000 series. The control arm body 2 has two side walls 3 parallel to each other, of which only a longitudinal portion of a side wall 3 of the control arm body 2 on the wheel carrier side is shown here.

An elongated hole 4 for an eccentric mount 5 is provided in the side wall 3. The eccentric mount 5 is also shown in FIG. 2 to FIG. 5. The eccentric mount 5 has a base plate 6 with an elongated hole 7. An anchor body 8 extending around the edge of the elongated hole opening 7 is formed on the rear of the base plate 6. Two eccentric stops 10 projecting from the base plate 6 are arranged at the front or on the front side 9 of the base plate 6. The anchor body 8 is formed in a ring-like manner around the elongated hole 7. The anchor body 8 has a ring 11 extending around the elongated hole opening 7, which projects from the rear side 12 of the base plate 6.

The eccentric mount 5 with the base plate 6, the anchor body 8 and the eccentric stops 10 are formed as a single piece of material.

The eccentric mount 5 is inserted with the anchor body 8 into the elongated hole 4 of the side wall 3 and press-joined in the elongated hole 4. The outer contour of the anchor body 8 and the inner contour of the elongated hole 4 in the side wall 3 of the control arm body 2 are manufactured and geometrically matched to one another in such a way that the press joint creates a press fit on the circumferential joining surfaces.

The eccentric stops 10 are formed by turned edge webs 13 on the outer circumference 14 of the base plate 6.

The eccentric mount 5 is made of a steel material and is provided with a surface coating. In at least one embodiment of the present disclosure, the surface coating is a zinc or zinc flake coating.

The press joint between the circumferential outer surface of the anchor body 8 and the inner surface of the elongated hole 4 in the side wall 3 creates a highly resilient force-fit joint. To increase the contact pressure, the anchor body 8 is able to be widened on the inside from the elongated hole opening 7 onwards. Optionally or additionally, the press joint is able to be supplemented by a form-fit joint. The anchor body 8 is able to be flanged, clinched or embossed at least in certain regions on the side 15 of the side wall 3 opposite the base plate 6. In at least one embodiment of the present disclosure, the anchor body 8 is able to pass through the elongated hole 4 in the side wall 3, at least in some regions, and is formed, for example flanged, clinched or embossed, on the side of the side wall 4 opposite the base plate 6.

Figure 2:
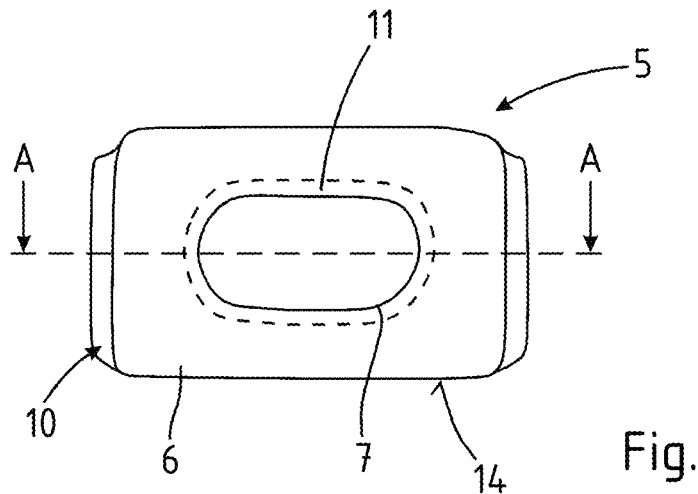
FIG. 2 shows the eccentric mount in a side view in accordance with the present disclosure.
Figure 3:
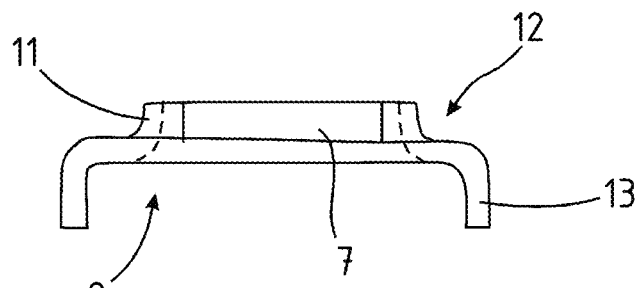
FIG. 3 shows the eccentric mount in a plan view in accordance with the present disclosure.
Figure 4:
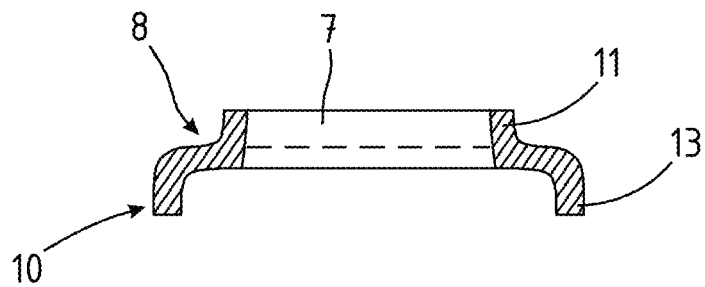
FIG. 4 shows a section through the representation of FIG. 2 as well as FIG. 5 along the line A-A in accordance with the present disclosure.

The illustration in FIG. 1 and FIG. 2 shows that the base plate 6 has a rectangular outer contour.

Figure 5:
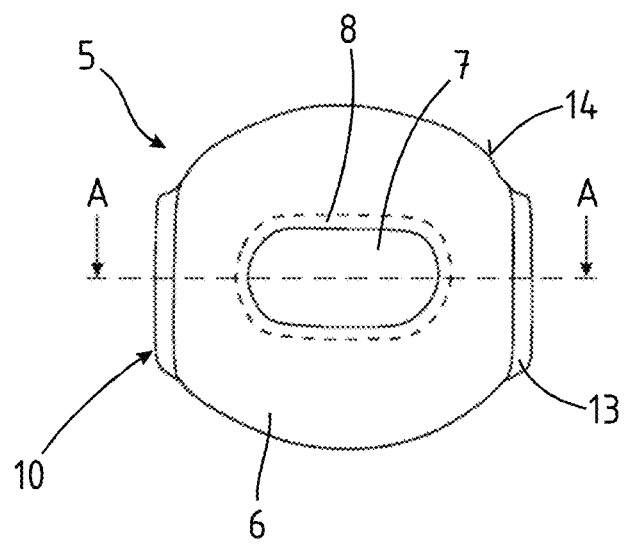
FIG. 5 shows another embodiment of an eccentric mount in a front view in accordance with the present disclosure.

The eccentric mount 5, as shown in FIG. 5, corresponds functionally to that described above. The base plate 6 has a circular outer contour.

As able to be seen in FIG. 1, the base plate 6 lies with its rear side 12 on the outside of the side wall 3 and protrudes from the outer surface of the side wall 3. A recess is also able to be adapted to the outer geometry of the base plate 6 is provided in the side wall 3, in which recess the eccentric mount 5 with the base plate 6 is arranged.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A control arm for a wheel suspension in a motor vehicle comprising:
a control arm body which has two side walls, wherein an elongated hole is in at least one side wall of the two side walls, and in the elongated hole an eccentric mount is fixed, the eccentric mount has a base plate with an elongated hole opening, wherein an anchor body extending at an edge of the elongated hole opening is at a rear of the base plate, and two eccentric stops projecting from the base plate are at a front of the base plate, the eccentric mount is pressed together with the anchor body in the elongated hole, wherein the anchor body is annular around the elongated hole opening, wherein a press joint is between a circumferential outer surface of the anchor body and an inner surface of the elongated hole in the at least one side wall.

2. The control arm according to claim 1, wherein the anchor body has a ring extending around the elongated hole opening and projecting from the rear of the base plate.

3. The control arm according to claim 1, wherein the two eccentric stops are formed by turned-over edge webs on an outer circumference of the base plate.

4. The control arm according to claim 1, wherein the eccentric mount and the base plate, the anchor body and the two eccentric stops comprise a single piece.

5. The control arm according to claim 1, wherein the anchor body passes through the elongated hole in the at least one side wall, and the anchor body is deformed on a side of the at least one side wall opposite the base plate.

6. The control arm according to claim 1, wherein the control arm body comprises aluminum.

7. The control arm according to claim 1, wherein the eccentric mount comprises steel.

8. The control arm according to claim 1, wherein the eccentric mount has a surface coating, the surface coating comprising a zinc or zinc flake coating.

9. The control arm according to claim 1, wherein the base plate has a rectangular outer contour.

10. The control arm according to claim 1, wherein the base plate has a circular or elliptical outer contour.

* * * * *